No. 854,905. PATENTED MAY 28, 1907.
J. G. PARK.
COTTON CLEANER AND SEPARATOR.
APPLICATION FILED OCT. 1, 1906.
2 SHEETS—SHEET 1.
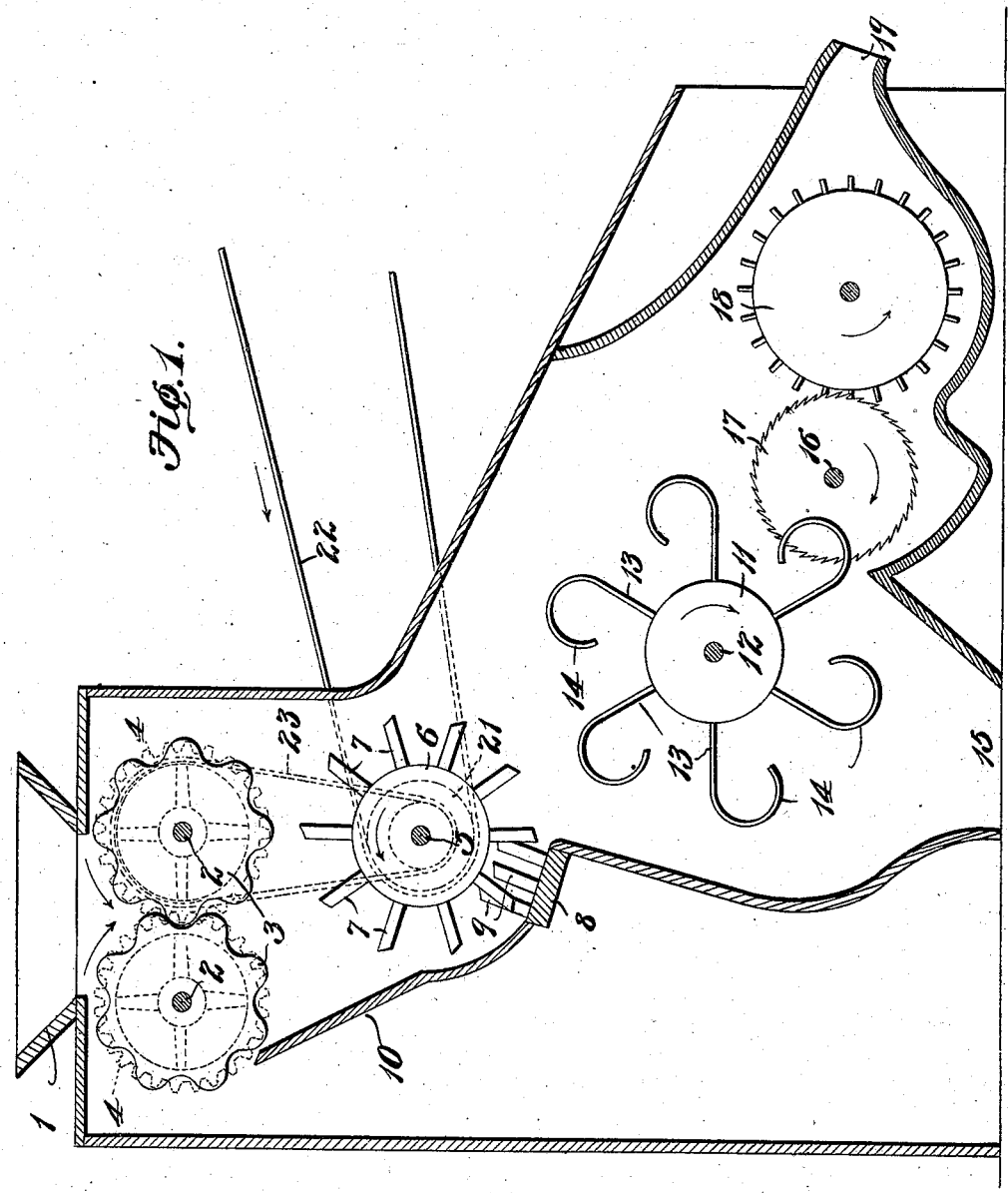
WITNESSES:
James G. Park,
INVENTOR
By
ATTORNEYS

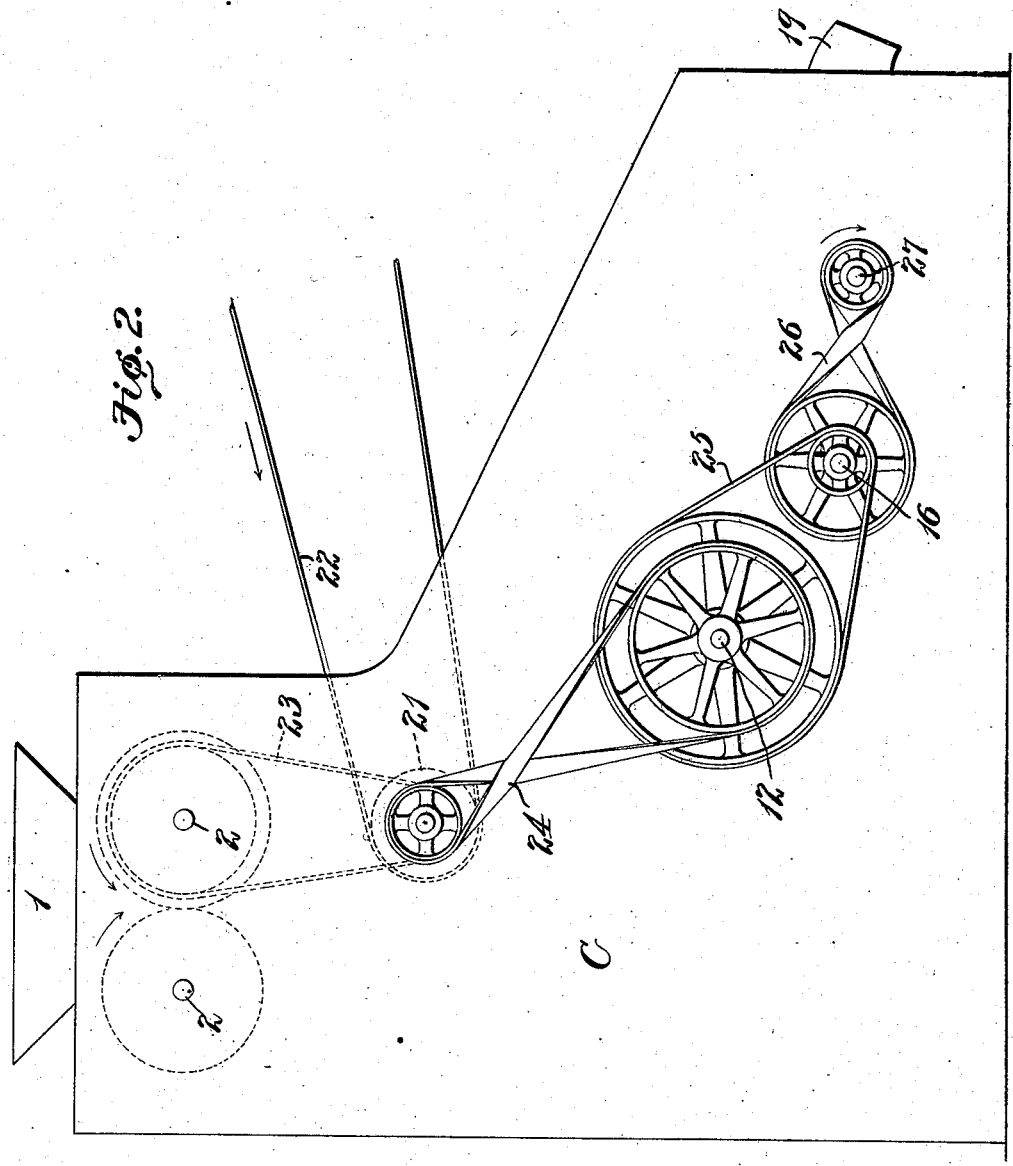

UNITED STATES PATENT OFFICE.

JAMES GASTON PARK, OF ALLIGATOR, MISSISSIPPI.

COTTON CLEANER AND SEPARATOR.

No. 854,905.　　　　Specification of Letters Patent.　　　　Patented May 28, 1907.

Application filed October 1, 1906. Serial No. 336,899.

*To all whom it may concern:*

Be it known that I, JAMES GASTON PARK, a citizen of the United States, residing at Alligator, in the county of Bolivar and State of Mississippi, have invented a new and useful Cotton Cleaner and Separator, of which the following is a specification.

This invention relates to an improved cotton cleaner and separator having for its object to effect in a convenient, thorough and expeditious manner the separation of the lint or staple from stalks, bolts and other trash.

The invention consists in the improved construction and novel arrangement and combination of parts, which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be made, when desired.

In the drawings, Figure 1 is a vertical longitudinal sectional view of a cotton cleaning and separating machine constructed in accordance with the principles of the invention. Fig. 2 is a side elevation of the same.

Corresponding parts in the several figures are indicated throughout by similar characters of reference.

A casing C of suitable construction is provided at the top thereof with an inlet hopper 1 beneath which, upon shafts 2, 2, there are mounted a pair of crushing rollers 3, 3, said rollers being longitudinally grooved or corrugated in such a manner as to mesh together, as will be clearly seen in Fig. 1 of the drawings; said rollers being slightly spaced apart in order that the material to be operated upon may readily pass between said rollers without being subjected to injurious pressure. The shafts 2, 2 are provided with intermeshing spur wheels or pinions 4, 4, so that they will be driven in opposite directions, as will be readily understood.

A shaft 5, supported for rotation in the casing below the shafts 2, 2, carries a picker cylinder 6 which is armed with radially extending teeth 7 resembling the teeth of a threshing cylinder; a cross bar 8 is suitably supported in the casing below and adjacent to the toothed cylinder 6, and said cross bar is equipped with teeth 9 disposed intercurrently with the teeth 7 of the cylinder; said toothed bar constituting a concave that coöperates with the picker cylinder to effect the desired reduction of the material operated upon. A shield or deflector 10 serves to guide the material delivered between the crushing rollers 3, 3 in the direction of the toothed cross bar or concave 8, so as to insure its being operated upon by the picker cylinder.

The material that escapes between the picker cylinder and the concave is delivered onto a second picker cylinder 11 mounted upon a shaft 12 which is supported for rotation below and in rear of the picker cylinder, and the direction of rotation of which is opposite to that of the picker cylinder 6. The picker cylinder 11 is provided with radially extending resilient teeth or fingers 13 having terminal coils 14 which are approximately circular and the axes of which are parallel to the axis of the cylinder 11. The material that drops upon the resilient hook-formed or coiled fingers of the picker cylinder will be distributed or disseminated over a considerable surface or area, and will be shaken up lightly so that separation will be readily effected; the coarse and heavy particles, such as pieces of stalk, bolls, gravel, and all kinds of impurities, passing between the fingers 14 and dropping into a forwardly directed discharge hopper 15 through which the waste products will be conducted to a place of discharge.

Below the cylinder 11, and somewhat in rear of said cylinder, there is mounted a shaft 16 carrying a plurality of saws 17, resembling ordinary gin saws, said saws being disposed intercurrently with the fingers 13 of the picker cylinder 11, the saw carrying shaft being rotated in the same direction as the picker cylinder; the saw carrying shaft is placed sufficiently close to the picker cylinder so that the saws 17 and the fingers 13 will overlap, as clearly seen in Fig. 1. The saws 17 serve to take the lint from the picker cylinder 11 and to carry it in a rearward direction, the lint being stripped from the saws by the action of the revoluble brush 18 which is supported for rotation adjacent to, and in rear of, the saw carrying shaft; said brush serving to convey the lint to the exit 19.

The movable parts of the machine may be driven in any suitable and convenient manner. For the purpose of illustration the cylinder shaft 5 has been shown as carrying a pulley 21 driven, as by a belt or band 22, from some convenient source of power, not shown; a belt 23 serves to transmit motion from the cylinder shaft 5 to the shaft 2 of one of the crushing cylinders 3; a twisted belt 24 has been shown as transmitting motion from the cylinder shaft 5 to the shaft 12 of the picker cylinder 11. From the latter motion is transmitted by a belt 25 to the saw carrying shaft 16; and a twisted belt 26 has been shown as transmitting motion from the saw carrying shaft to the shaft 27 carrying the brush 18; band wheels or pulleys are employed throughout of suitable sizes to cause the various shafts to be driven at the requisite speed.

From the foregoing description, taken in connection with the drawings hereto annexed, the operation and advantages of this invention will be readily understood. This machine will be found extremely useful and effective for saving cotton contained in unopened bolls, or cotton that has become mixed up with large quantities of trash. If desired, the machine may be utilized as a gin feeder, the material discharged through the exit 19 being directed into the receiving hopper of an ordinary gin. Material fed into the hopper 1 of the improved machine will first be seized and operated upon by the crushing rollers 3, 3, from which it is discharged over the shield or apron 10 in the direction of the picker cylinder 6 and concave where the material is further broken up and reduced, so that when it is discharged upon the picker cylinder 11, the trash will sift between the teeth of said picker cylinder and be discharged through the hopper 15, while the lint will be caught by the saws, stripped from the latter by the revolving brush, and discharged at the exit.

It is to be distinctly understood that the means for transmitting motion between the moving parts of the machine may be other than those herein described without departing from the spirit of the invention.

Having thus described the invention, what is claimed is:—

1. In a machine of the class described, a picker cylinder having radial resilient teeth or fingers provided with terminal coils or approximately circular hooks said coils being turned in a direction opposite the direction of movement thereof.

2. In a machine of the class described, a picker cylinder having radial resilient teeth provided with approximately circular terminal coils whose axes are parallel to the axis of the cylinder said coils being turned in a direction opposite the direction of movement thereof.

3. In a machine of the class described, a toothed cylinder and a toothed bar constituting a concave coöperating with the cylinder; in combination with non-yielding, intermeshing corrugated crushing rollers disposed to feed material to the cylinder and concave, and a picker cylinder disposed to receive material from said cylinder and concave; said picker cylinder having radial resilient teeth provided with terminal coils said coils being turned in a direction opposite the direction of movement thereof.

4. In a machine of the class described, a casing having an inlet hopper, a trash exit and a lint exit; a pair of non-yielding, intermeshing crushing and feeding rollers disposed beneath the inlet hopper, a toothed cylinder and concave disposed beneath and receiving material from the crushing and feeding rollers, a picker cylinder disposed beneath and receiving material from the cylinder and concave, said picker cylinder being provided with radial resilient teeth having terminal coils turned in a direction opposite the direction of movement thereof and said picker cylinder being disposed above the trash exit, a saw carrying shaft supported for rotation adjacent to the picker cylinder and having saws disposed intercurrently with and overlapping the picker teeth, and a brush cylinder supported for rotation adjacent to the saw and adapted to strip material from the saws and to convey the same to the lint exit.

In testimony that I claim the foregoing as my own, I have hereto affixed my signature in the presence of two witnesses.

JAMES GASTON PARK.

Witnesses:
F. H. LEWIS,
A. M. WEAVER.